United States Patent
Shukuya

(10) Patent No.: US 7,518,628 B2
(45) Date of Patent: Apr. 14, 2009

(54) IMAGE FORMING APPARATUS CAPABLE OF EFFECTIVELY CORRECTING MAIN SCANNING MISREGISTRATION

(75) Inventor: Yuichiro Shukuya, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 170 days.

(21) Appl. No.: 11/586,565

(22) Filed: Oct. 26, 2006

(65) Prior Publication Data
US 2007/0091165 A1 Apr. 26, 2007

(30) Foreign Application Priority Data
Oct. 26, 2005 (JP) ............................ 2005-311139

(51) Int. Cl.
*B41J 2/435* (2006.01)
(52) U.S. Cl. .................................... 347/249
(58) Field of Classification Search ................ 347/116, 347/229, 234–235, 248–250; 358/1.9, 501; 359/217; 250/208.1
See application file for complete search history.

(56) References Cited

U.S. PATENT DOCUMENTS 4,962,981 A * 10/1990 Murakami et al. .......... 359/217
5,610,651 A * 3/1997 Yamakawa et al. .......... 347/250
7,271,824 B2 * 9/2007 Omori et al. ................ 347/249
7,355,765 B2 * 4/2008 Yoshida ..................... 358/501
2004/0056178 A1* 3/2004 Takeyama et al. ......... 250/208.1
2006/0001891 A1* 1/2006 Yoshida ..................... 358/1.9

FOREIGN PATENT DOCUMENTS

JP 2003-279873 10/2003
JP 3548210 4/2004

* cited by examiner

*Primary Examiner*—Hai C Pham
(74) *Attorney, Agent, or Firm*—Oblon, Spivak, McClelland Maier & Neustadt, P.C.

(57) ABSTRACT

An image forming apparatus includes a light source, a deflector, beam detectors, a clock generator, a measurement mechanism, a frequency corrector, and a phase corrector. The light source illuminates in response to image data. The deflector deflects an optical beam into a scanning beam. The beam detectors including first and second beam detectors detect the scanning beam. The clock generator generates writing clock signals. The measurement mechanism measures a count number of the writing clock signals generated during a period between the scanning beam is detected by the first and second beam detectors. The frequency corrector corrects a frequency of the writing clock signals such that the count number measured becomes substantially equivalent to a predetermined number. The phase corrector varies a phase of the writing clock signals such that the count number is substantially constant before and after the phase of the writing clock signals is varied.

11 Claims, 14 Drawing Sheets

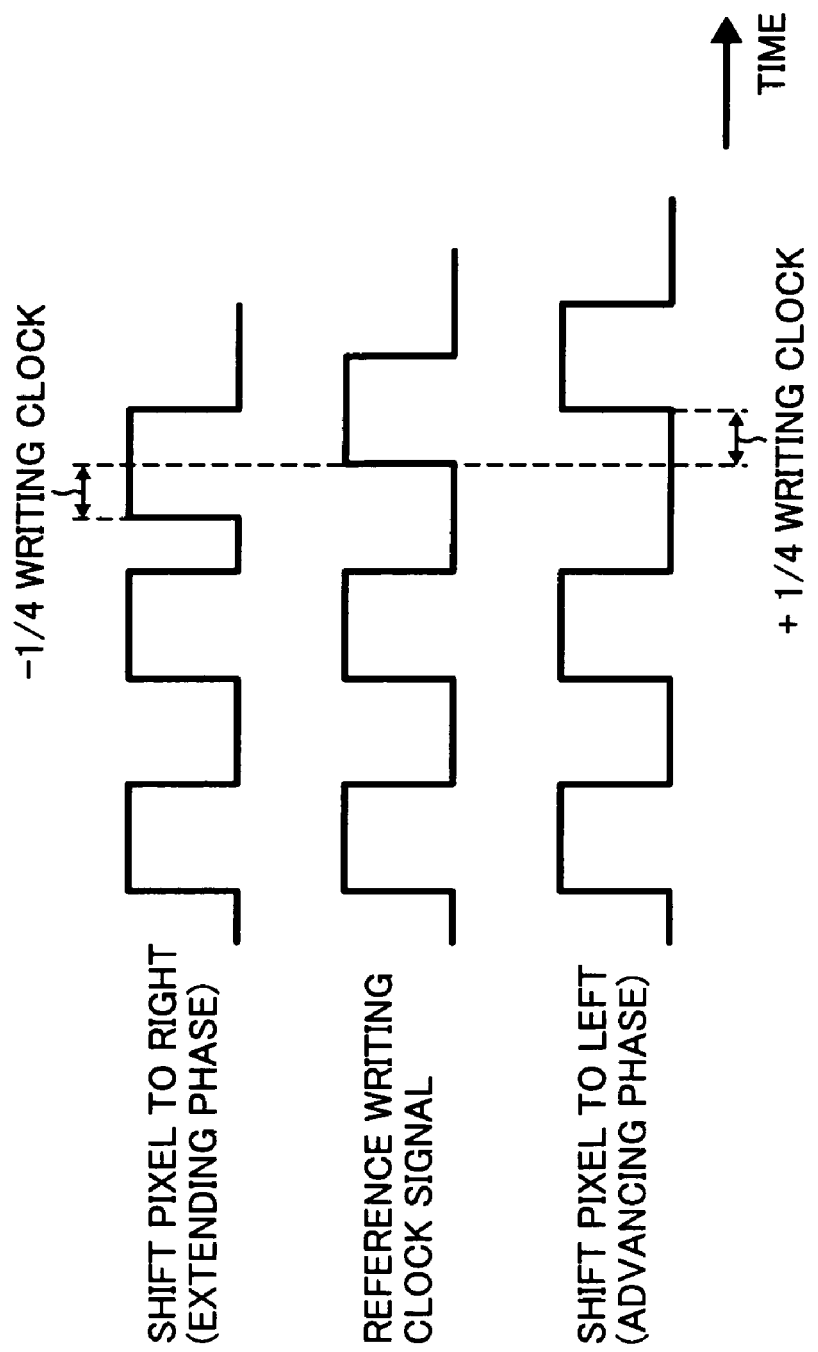

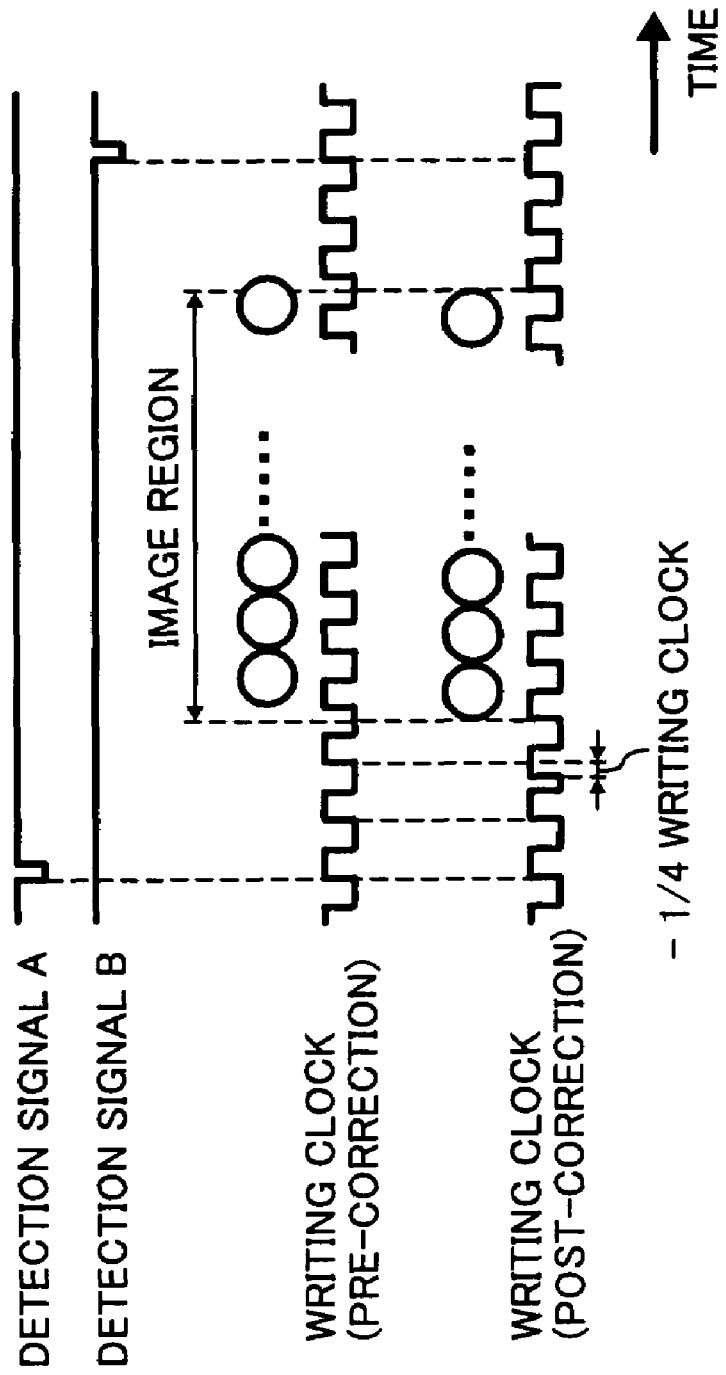

FIG. 6
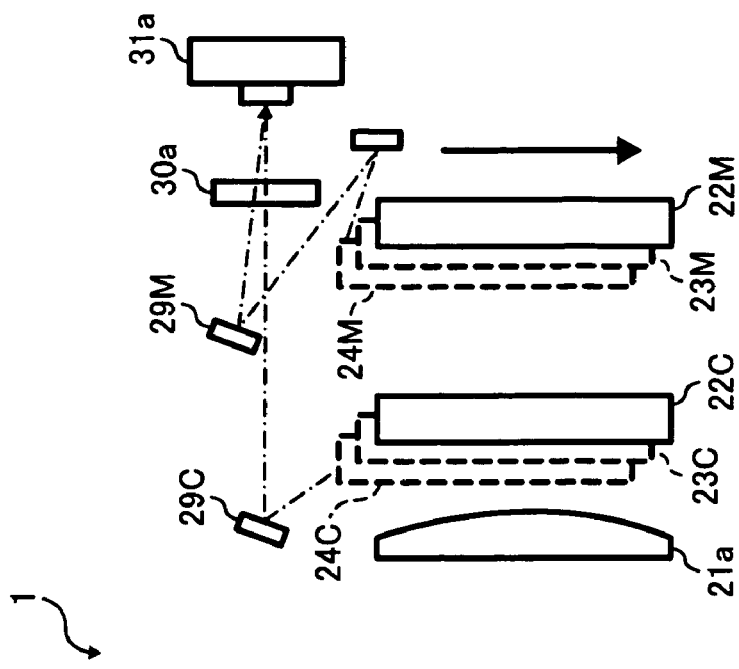
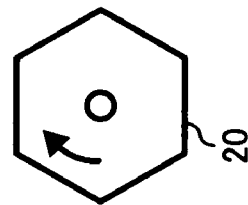
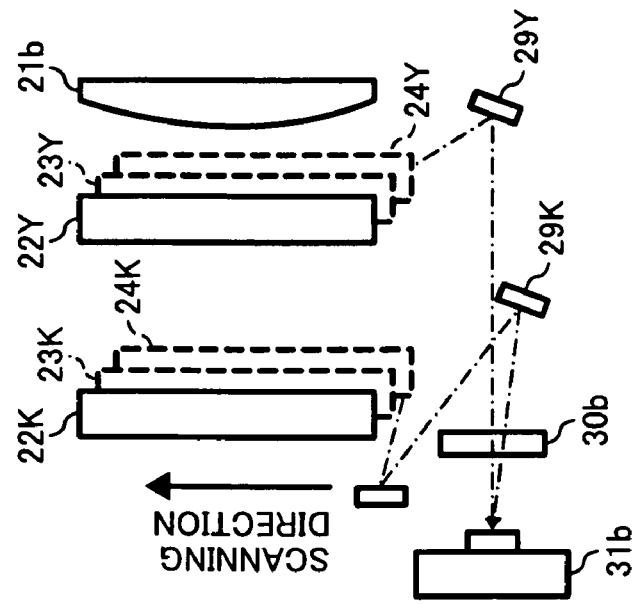

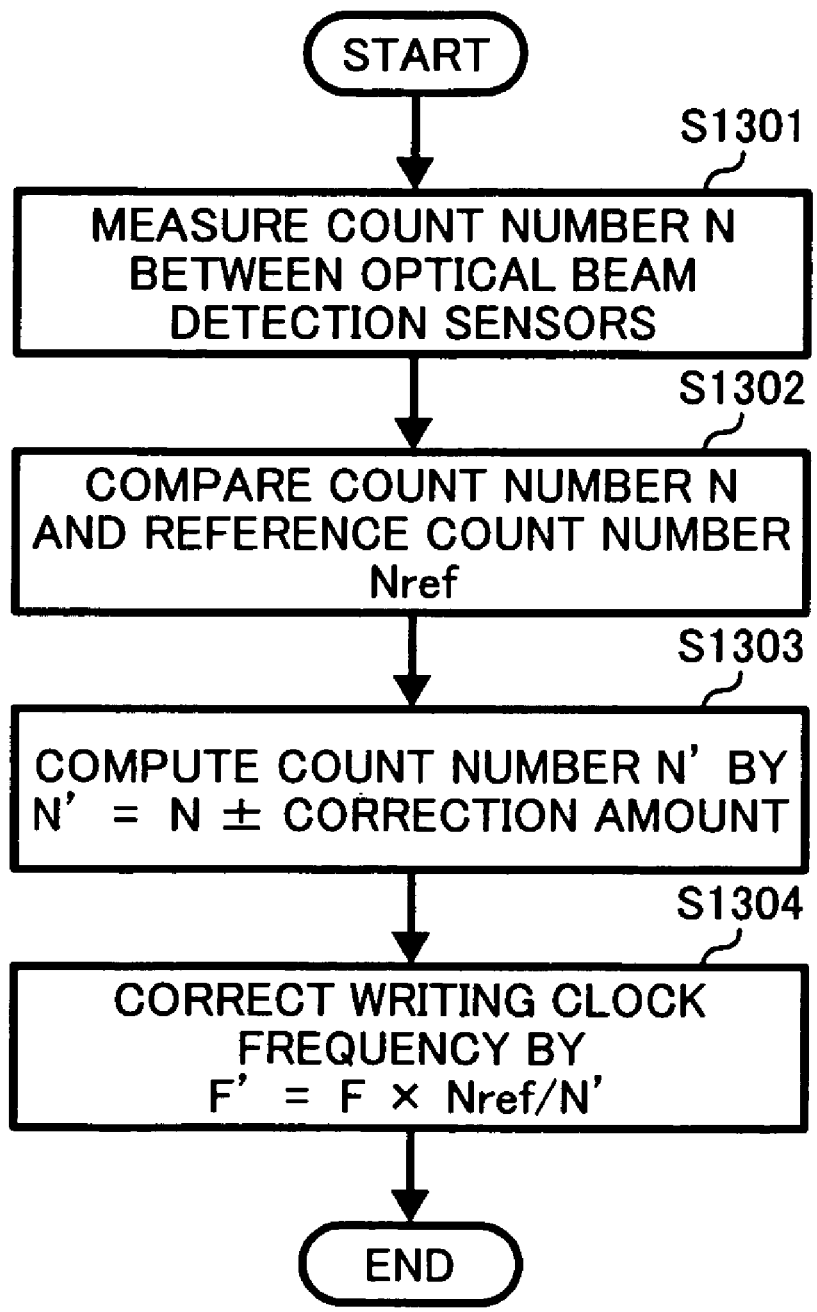

IMAGE FORMING APPARATUS CAPABLE OF EFFECTIVELY CORRECTING MAIN SCANNING MISREGISTRATION

CROSS-REFERENCE TO RELATED APPLICATION

This patent specification is based on, and claims priority from, Japanese patent application, No. 2005-311139 filed on Oct. 26, 2005 in the Japan Patent Office, the entire contents of which are incorporated by reference herein.

BACKGROUND

1. Field of Invention

Exemplary aspects of the present invention relate to an apparatus for image forming, and more particularly to an apparatus for image forming capable of effectively correcting a misregistration when an image is written.

2. Description of the Related Art

A related art image forming apparatus such as a copying machine and a printer, for example, is generally provided with an optical device to produce an optical beam and uses it to write image information on a photoconductor. Such a related art image forming apparatus may employ a plastic lens to provide the optical beam to meet recent trends of reducing costs and weights, for example. In addition, the related art image forming apparatus has increasingly penetrated its market and expanded the range of uses and, as a consequence, it needs to satisfy the market demands for a higher accuracy of an image magnification in a variable magnification operation.

The related art image forming apparatus is generally configured to modulate the optical beam based on image data, and to deflect the optical beam in a main scanning direction by a deflection mechanism (e.g., a polygon mirror) so as to make the optical beam scan a photoconductor surface through optical elements including an Fθ lens.

However, each of the related art image forming apparatuses may have a different main scanning magnification due to a variation in the optical device and/or properties of optical elements such as the Fθ lens. A defective operation, for example, a magnification error or a misregistration of a writing start position, may also be generated by a change in a refractive index or a shape of the plastic lens and a change in a scanning position on the photoconductor caused by a variation in an environmental temperature or a variation in a temperature of the apparatus therein. Thereby, an image with a high quality may not be provided. When a related art color image forming apparatus for forming a color image by superimposing a plurality of color images is used, the defective operation, including the magnification error or the misregistration of the writing start position, may be generated in a color basis. Thereby, the main scanning magnification or writing start position for each color may need to be corrected.

One example has attempted to correct a registration of an image in units of 1 pixel or less by using a phase variable function. This phase variable function, for example, varies a phase of writing clock signals in units of 1/n of a writing clock cycle, where n is an integer of 2 or greater, at a position or a plurality of positions in the main scanning direction.

According to the above example, the image forming apparatus and a light scanning device of the related arts correct the misregistration of the main scanning position by having the phase variable control function to control a variation of the phase of writing clock signals as a correction mechanism. The phase of the writing clock signals may be varied in units of 1/n of the writing clock cycle, where n is an integer of 2 or greater, at the one position or the plurality of positions in the main scanning direction by the phase variable function so that the misregistration of the main scanning position is corrected.

Referring to FIG. 1A, the misregistration of the main scanning position may be corrected by varying the writing clock phase when n is 4, i.e., 1/n=¼, for example, based on a reference writing clock signal.

Referring to FIG. 1B, when the writing start position for the main scanning is corrected, the phase of writing clock signals generated between two detection signals A and B is varied.

Another example has attempted to correct the main scanning magnification by correcting the writing clock based on a comparison with a predetermined reference count number. According to this example, a plurality of optical beam detection mechanisms to detect the optical beam on a main scanning line are employed so as to measure an interval between the optical beam detected by one of the plurality of optical beam detection mechanisms and the optical beam detected by another optical detection mechanism by using a predetermined clock number.

When the main scanning magnification is corrected by the example stated above but under a situation of FIG. 1B, the count number of the writing clock signals may vary an amount which is a correction amount generated by the phase variable function, and a frequency of the writing clock signals may be varied at the same time. Thereby, the main scanning magnification may be affected.

Referring to a flowchart of FIG. 2, one example of a related art correction procedure is explained, for a correction of the main scanning magnification in a related art image forming apparatus. In a step 1201, a scanning time (e.g., a count number) NC between optical beam detection mechanisms is counted. When a clock counter in a writing clock generator is cleared by a detection signal of a synchronous detection plate, measurement clock signals are counted by the clock counter. A count number of the measurement clock signals counted by the clock counter is output to a control unit by a detection signal of a rear-end synchronous detection plate.

In a step 1202, the count number NC and a reference count number NR are compared with each other by the control unit. The reference count number NR is a predetermined number. In a step 1203, a writing clock frequency is corrected by computing f'=f×NR/NC, where f' is a writing clock frequency after a correction is made, and f is the writing clock frequency before the correction is made.

According to the above procedure, the count number and the writing clock number frequency which are at least substantially the same as those between the optical beam detection mechanisms are computed. The control unit outputs the computed writing clock frequency to a writing clock generator so as to correct the main scanning magnification.

However, the measured count number may be varied when a phase of the writing clock signals is varied by a phase variation function because the writing clock signal is used to measure the scanning time.

SUMMARY

An image forming apparatus includes a light source, a deflector, a plurality of beam detectors, a clock generator, a measurement mechanism, a frequency corrector, and a phase corrector. The light source illuminates in response to image data. The deflector deflects an optical beam output from the light source into a scanning beam running along a main scanning line across an image forming area in a main scanning direction. The plurality of beam detectors detect the scanning beam at a plurality of different positions along the main scanning line. The plurality of beam detectors include first and second beam detectors to detect the scanning beam at positions in front-end and rear-end sides respectively in the main scanning direction. The clock generator generates writing clock signals for controlling an illumination of the light source. The measurement mechanism measures a count number of the writing clock signals generated during a scanning period between detections of the scanning beam by the first and second beam detectors. The frequency corrector corrects a frequency of the writing clock signals in such a manner that the count number measured by the measurement mechanism becomes substantially equivalent to a predetermined reference count number. The phase corrector varies a phase of the writing clock signals in such a manner that the count number is substantially constant before and after the phase of the writing clock signals is varied.

An image forming apparatus includes a light source, a deflector, a plurality of beam detectors, a clock generator, a measurement mechanism, a phase corrector, and a frequency corrector. The light source illuminates in response to image data. The deflector deflects an optical beam output from the light source into a scanning beam running along a main scanning line across an image forming area in a main scanning direction. The plurality of beam detectors detect the scanning beam at a plurality of different positions along the main scanning line. The plurality of beam detectors include first and second beam detectors detecting the scanning beam at positions in front-end and rear-end sides respectively in the main scanning direction. The clock generator generates writing clock signals for controlling an illumination of the light source. The measurement mechanism measures a count number of the writing clock signals generated during a scanning period between detections of the scanning beam by the first and second beam detectors. The phase corrector varies a phase of the writing clock signals. The frequency corrector modifies the count number measured by the measurement mechanism based on a phase variation of the writing clock signals performed by the phase corrector, and corrects the writing clock frequency in such a manner that the modified count number is substantially equalized to a predetermined reference number.

An optical apparatus includes a light source, a deflector, a plurality of beam detectors, a clock generator, a measurement mechanism, a frequency corrector, and a phase corrector. The light source illuminates in response to image data. The deflector deflects an optical beam output from the light source into a scanning beam running along a main scanning line across an image forming area in a main scanning direction. The plurality of beam detectors detect the scanning beam at a plurality of different positions along the main scanning line. The plurality of beam detectors include first and second beam detectors detecting the scanning beam at positions in front-end and rear-end sides respectively in the main scanning direction. The clock generator generates writing clock signals for controlling an illumination of the light source. The measurement mechanism measures a count number of the writing clock signals generated during a scanning period between detections of the scanning beam by the first and second beam detectors. The frequency corrector corrects a frequency of the writing clock signals in such a manner that the count number measured by the measurement mechanism becomes substantially equivalent to a predetermined reference count number. The phase corrector varies a phase of the writing clock signals in such a manner that the count number is substantially constant before and after the phase of the writing clock signals is varied.

BRIEF DESCRIPTION OF THE DRAWINGS

A more complete appreciation of the exemplary aspects of the invention and many of the attendant advantage thereof will be readily obtained as the same becomes better understood by reference to the following detailed description when considered in connection with the accompanying drawings, wherein:

FIG. 1A and FIG. 1B illustrate examples of phase variation processes of writing clock signals used in a related art image forming apparatus;

FIG. 6 is another schematic top view illustrating the optical device of FIG. 4;

FIG. 14 is a flowchart for explaining an example procedure of a main scanning magnification when a phase of the writing clock signals is varied.

DETAILED DESCRIPTION OF EXEMPLARY EMBODIMENTS

Figure 2:
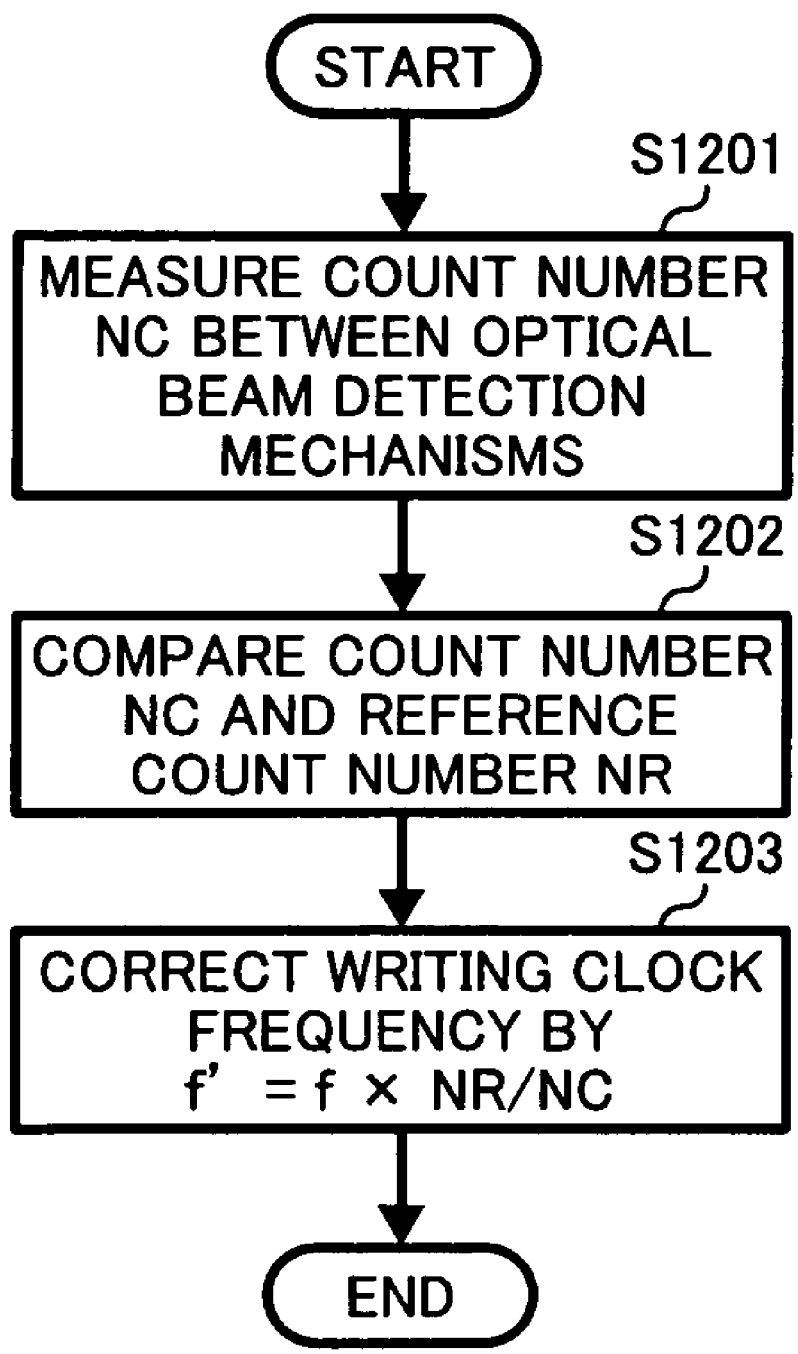
FIG. 2 is a flowchart for explaining an example of a related art procedure of correcting a main scanning magnification.

In describing exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, an image forming apparatus according to at least a first exemplary embodiment of the present invention is described.

Figure 3:
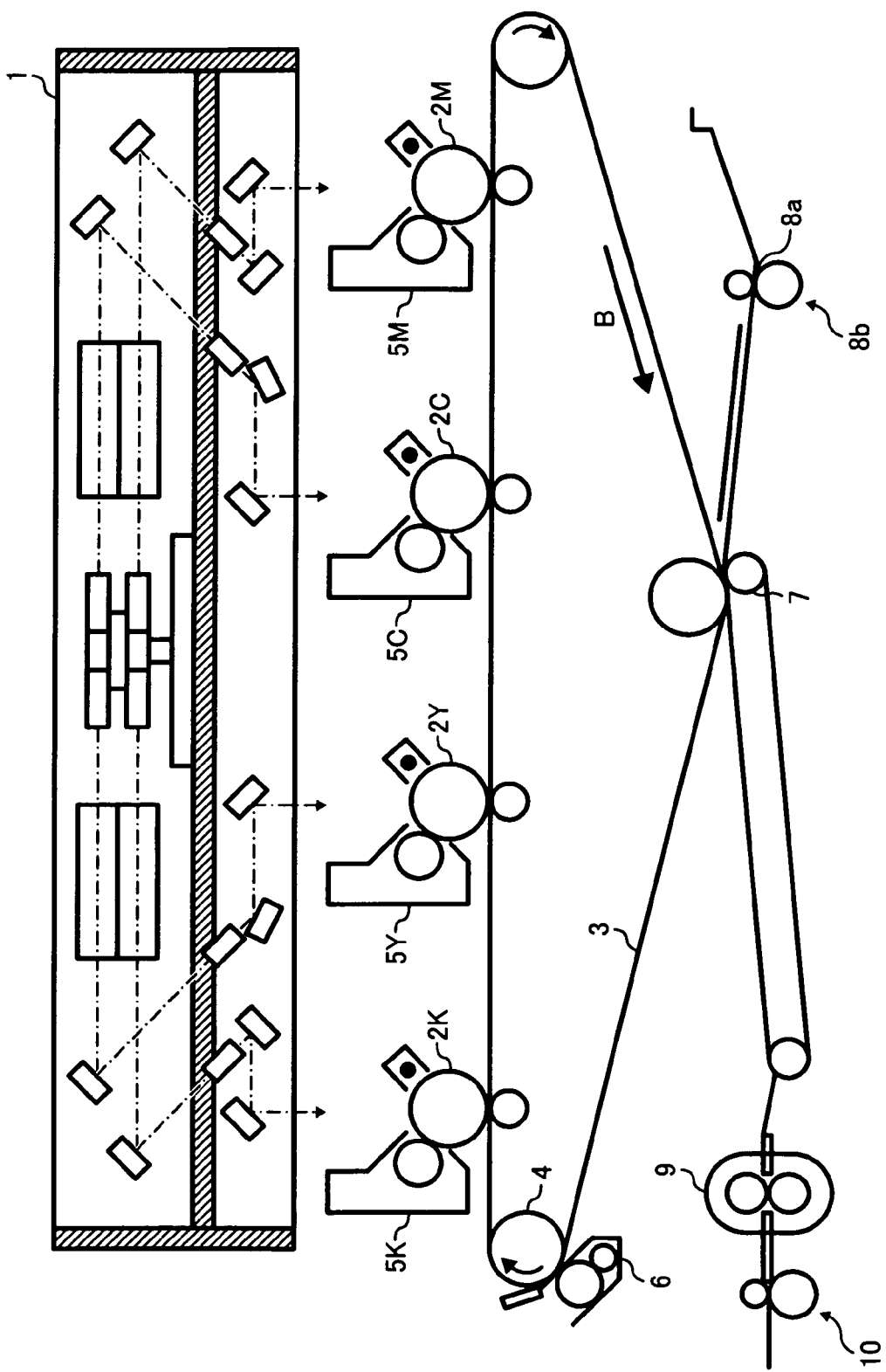
FIG. 3 is a schematic diagram illustrating an image forming apparatus according to an exemplary embodiment of the present invention.

Referring to FIG. 3, the image forming apparatus forming toner images of four colors, black, yellow, cyan, and magenta includes an optical device 1, photoconductor drums 2K, 2Y, 2C, and 2M, an intermediate transfer belt 3, intermediate transfer rollers 4, development devices 5K, 5Y, 5C, and 5M, a belt cleaning device 6, a transfer device 7, a paper-feed registration sensor 8a, a registration roller 8b, a fixing device 9, and an ejection device 10.

The image forming apparatus including the optical device 1 according to at least the first exemplary embodiment of the present invention employs a light source, for example, a laser diode, to irradiate surfaces of the photoconductor drums 2K, 2Y, 2C, and 2M with optical beams so as to form electrostatic latent images. This exemplary embodiment illustrates a full color image forming apparatus which forms a full color image by superimposing toner images of four colors. However, the exemplary embodiment is also applied to a monochrome image forming apparatus. In the full color image forming apparatus of the exemplary embodiment, toner colors of black, yellow, cyan, and magenta are respectively indicated in K, Y, C, and M, and these color symbols may be omitted as necessary.

The optical device 1 emits the laser beams to expose the surfaces of the photoconductor drums 2K, 2Y, 2C, and 2M. The photoconductor drum 2K, 2Y, 2C, and 2M form electrostatic latent images thereon by the laser beams emitted from the optical device 1. The intermediate transfer belt 3 is an intermediate transfer member on which a toner image is transferred. The intermediate transfer rollers 4 rotate the intermediate transfer belt 3. The development devices 5K, 5Y, 5C, and 5M develop the electrostatic latent images on the photoconductors 2K, 2Y, 2C, and 2M with toners. The belt cleaning device 6 removes a remaining toner from the intermediate transfer belt 3. The transfer device 7 transfers the toner image on the intermediate transfer belt 3 onto the transfer sheet. The paper-feed registration sensor 8a detects a leading end of the transfer sheet. The registration roller 8b registers the transfer sheet. The fixing device 9 fixes the toner image on the transfer sheet. The ejection device 10 ejects the transfer sheet on which the toner image is fixed.

The optical device 1 emits the optical beams at controlled timings so as to expose the photoconductors 2 when an image forming operation is requested from an operation unit (not shown) by a user or when a print start signal to start a print job is received from a host computer connected by a network. A detailed description of the optical device 1 will be given with reference to FIG. 4 though FIG. 6.

Each of the development devices 5K, 5Y, 5C, and 5M forms a single color image on each of the respective photoconductor drums 2K, 2Y, 2C, and 2M which is rotated and exposed to the optical beam.

When the photoconductor drums 2K, 2Y, 2C, and 2M form respective single color images thereon, the intermediate transfer belt 3 is rotationally driven. The intermediate transfer belt 3 is rotationally driven by one of three intermediate transfer rollers 4 as a drive roller, and is conveyed to a direction B shown with an arrow in FIG. 3 by other two intermediate transfer rollers 4 as driven rollers.

The single color images formed on the photoconductor drums 2K, 2Y, 2C, and 2M are sequentially transferred and superimposed onto the intermediate transfer belt 3 by development of the photoconductor drums 2K, 2Y, 2C, and 2M and conveyance of the intermediate transfer belt 3 so that the full color image is formed on the intermediate transfer belt 3.

When the print start signal is received, a paper-feed unit (not shown) separates one transfer sheet from a plurality of the transfer sheets so as to convey the one transfer sheet to the paper-feed registration sensor 8a. When the one transfer sheet abuts the paper-feed registration sensor 8a, a conveyance of the one transfer sheet is stopped. The registration roller 8b is rotated at a desired timing for conveyance of the full color image formed on the intermediate transfer belt 3 so that the one transfer sheet is fed between the intermediate transfer belt 3 and the transfer device 7. Thereby, the full color image is transferred onto the one transfer sheet by the transfer device 7.

The transfer sheet on which the toner image is transferred by the transfer device 7 is conveyed to the fixing device 9 in which a heat and a pressure are applied to fix the transferred image. The transfer sheet is ejected by an ejection roller included in the ejection device 10, and is stacked on an ejection tray (not shown).

The image forming apparatus of the exemplary embodiment forms the images of four colors by employing one optical device that is the optical device 1 while a related art optical device included in the related art image forming apparatus has four optical devices to form the images of four colors.

A detailed description of the optical device 1 included in the image forming apparatus of FIG. 3 will be given as follows with FIG. 4 through FIG. 6.

Figure 4:
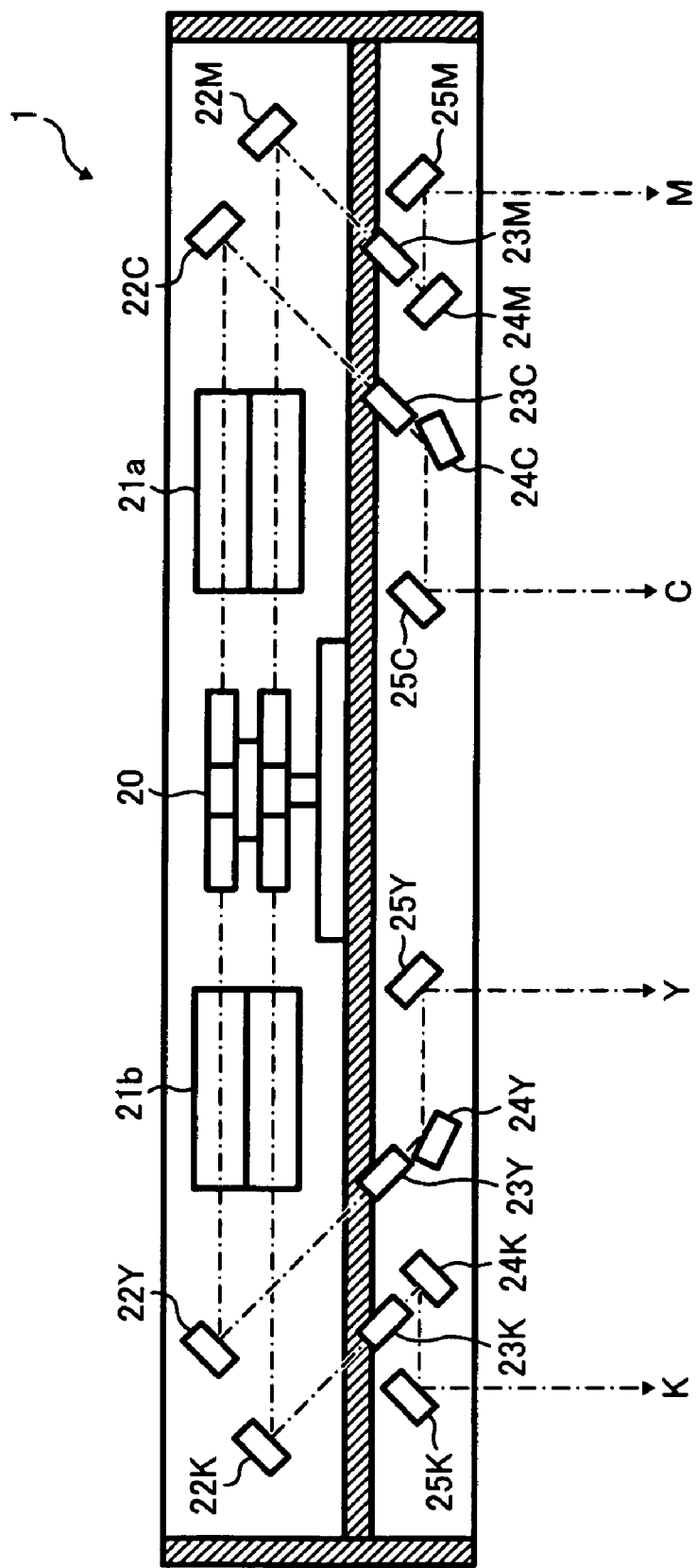
FIG. 4 is a cross sectional view illustrating an optical device included in the image forming apparatus of FIG. 3.

Referring to FIG. 4, the optical device 1 includes a polygon mirror 20, fθ lenses 21a and 21b, first mirrors 22K, 22Y, 22C, and 22M, curve axis toroidal lenses 23K, 23Y, 23C, and 23M, second mirrors 24K, 24Y, 24C, and 24M, and third mirrors 25K, 25Y, 25C, and 25M.

The polygon mirror 20 is disposed in a center of the optical device 1. This polygon mirror 20 deflects the optical beams of four colors in a main scanning direction. Optical elements, for example, the fθ lenses 21a and 21b, the first mirrors 22K, 22Y, 22C, and 22M, the curve axis toroidal lenses 23K, 23Y, 23C, and 23M, the second mirrors 24K, 24Y, 24C, and 24M, and the third mirrors 25K, 25Y, 25C, and 25M, are disposed symmetrically to a central polygon mirror 20. Because of this symmetrical disposition, optical paths for the optical beams of two colors are provided symmetrically so that the polygon mirror 20 deflects the optical beams of the four colors. As shown in FIG. 4, the optical paths for black and yellow are provided in a left side of the polygon mirror 20, and the optical paths for cyan and magenta are provided in a right side of the polygon mirror 20.

An operation of the optical device 1 will be given as follows. Laser diodes (not shown) mounted in laser units 26K, 26Y, 26C, and 26M (shown in FIG. 5) emit the optical beams which are entered to cylindrical lenses 27K, 27Y, 27C, and 27M (shown in FIG. 5). The cylindrical lenses 27K, 27Y, 27C, and 27M have respective desired refractive indexes in a sub-scanning direction so that the optical beams emitted from the laser units 26K, 26Y, 26C, and 26M are condensed in the sub-scanning direction, and are entered to a mirror side of the polygon mirror 20. The polygon mirror 20 deflects the entered optical beams in the main scanning direction by high-speed rotations driven by a motor (not shown). The fθ lenses 21a and 21b are lenses to correct scanning velocity of the laser beams. The first mirrors 22K, 22Y, 22C, and 22M reflect the optical beams deflected by the polygon mirror 20.

After the optical beams reflected by the first mirrors 22K, 22Y, 22C, and 22M are entered to the curve axis toroidal lenses 23K, 23Y, 23C, and 23M, the optical beams are entered to the second mirrors 24K, 24Y, 24C, and 24M. The curve axis toroidal lenses 23K, 23Y, 23C, and 23M correct a property of the optical face tangle error of the polygon mirror 20. The optical beams reflected by the second mirrors 24K, 24Y, 24C, and 24M are reflected by the third mirrors 25K, 25Y, 25C, and 25M so that the optical beams exit from the optical device 1 for forming electrostatic images on the respective photoconductors 2K, 2Y, 2C, and 2M. As stated above, the optical elements are disposed symmetrically to the central polygon mirror 20, and the optical paths for the optical beams of two colors are provided symmetrically in the optical device 1 of the exemplary embodiment.

Figure 5:
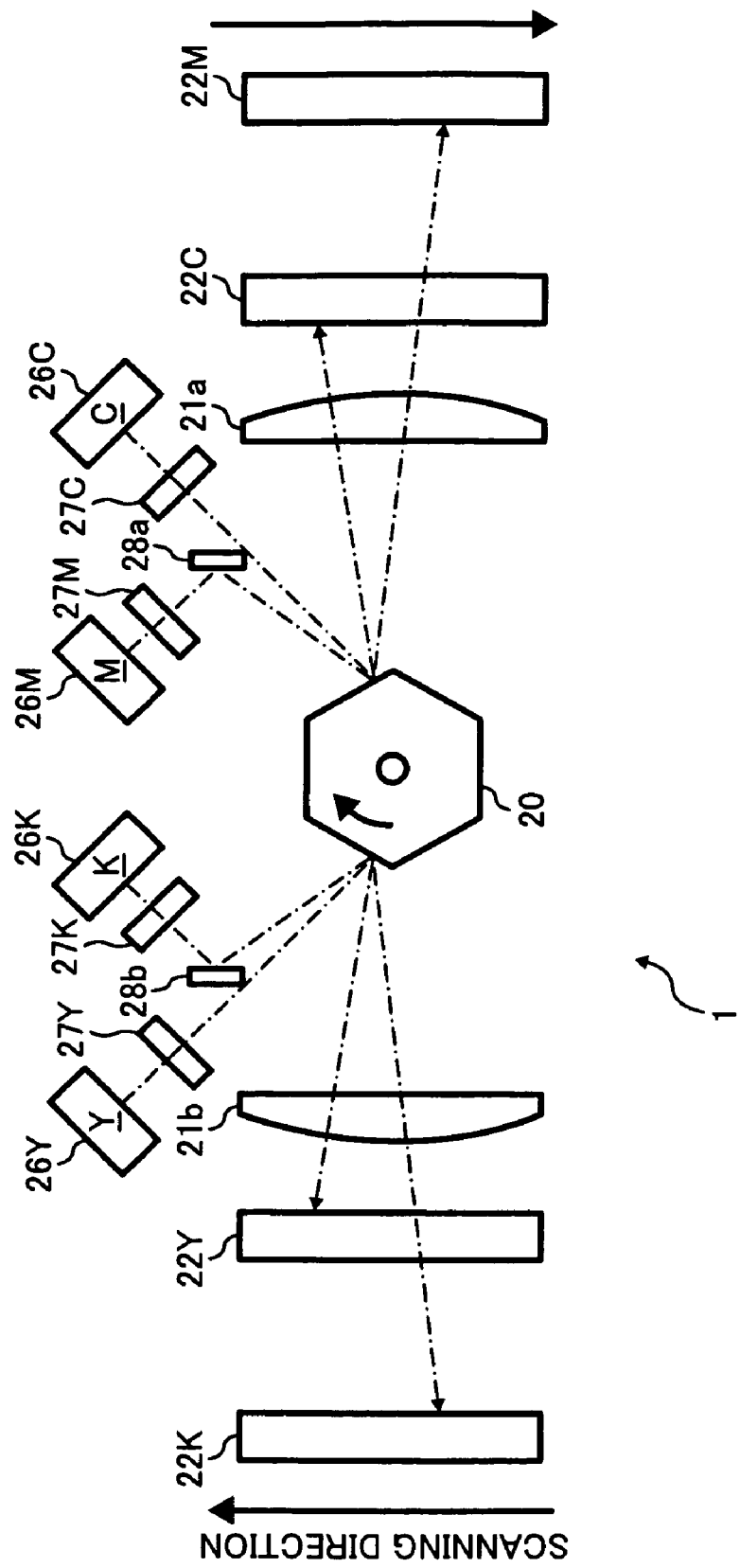
FIG. 5 is a schematic top view illustrating the optical device of FIG. 4.

Referring to FIG. 5, a top view of the optical device 1 includes the polygon mirror 20, the fθ lenses 21a and 21b, the first mirrors 22K, 22Y, 22C, and 22M, the laser units 26K, 26Y, 26C, and 26M, the cylindrical lenses 27K, 27Y, 27C, and 27M, and reflection mirrors 28a and 28b.

As stated above, the laser units 26K, 26Y, 26C, and 26M emit the optical beams from the laser diodes (not shown) so that the optical beams are entered to the cylindrical senses 27K, 27Y, 27C, and 27M. The cylindrical lenses 27K, 27Y, 27C, and 27M have respective desired refractive indexes in the sub-scanning direction so that the optical beams emitted from the laser units 26K, 26Y, 26C, and 26M are condensed in the sub-scanning direction. The reflection mirrors 28a and 28b may be used to reflect the optical beams so that the optical beams are entered to the polygon mirror. When the polygon mirror 20 deflects the entered optical beams in the main scanning direction, the first mirrors 22K, 22Y, 22C, and 22M reflect the optical beams deflected by the polygon mirror 20 through the fθ lenses 21a and 21b.

Referring to FIG. 6, another schematic top view of the optical device 1 is illustrated. The optical beams reflected in certain positions of the main scanning direction by the second mirrors 24K, 24Y, 24C, and 24M (shown in FIG. 4) are reflected by synchronous detection reflection mirrors 29K, 29Y, 29C, and 29M towards synchronous detection lenses 30a and 30b. Thereby, the optical beams are entered to synchronous detection sensors 31a and 31b. The synchronous detection lenses 30a and 30b condense the optical beams to the synchronous detection sensors 31a and 31b. The synchronous detection sensors 31a and 31b are disposed symmetrically, and detect timings at which the optical beams of two colors are entered. In other words, the synchronous detection sensor 31a detects main scanning reference positions of cyan and magenta while the synchronous detection sensor 31b detects the optical beams of black and yellow.

Figure 7:
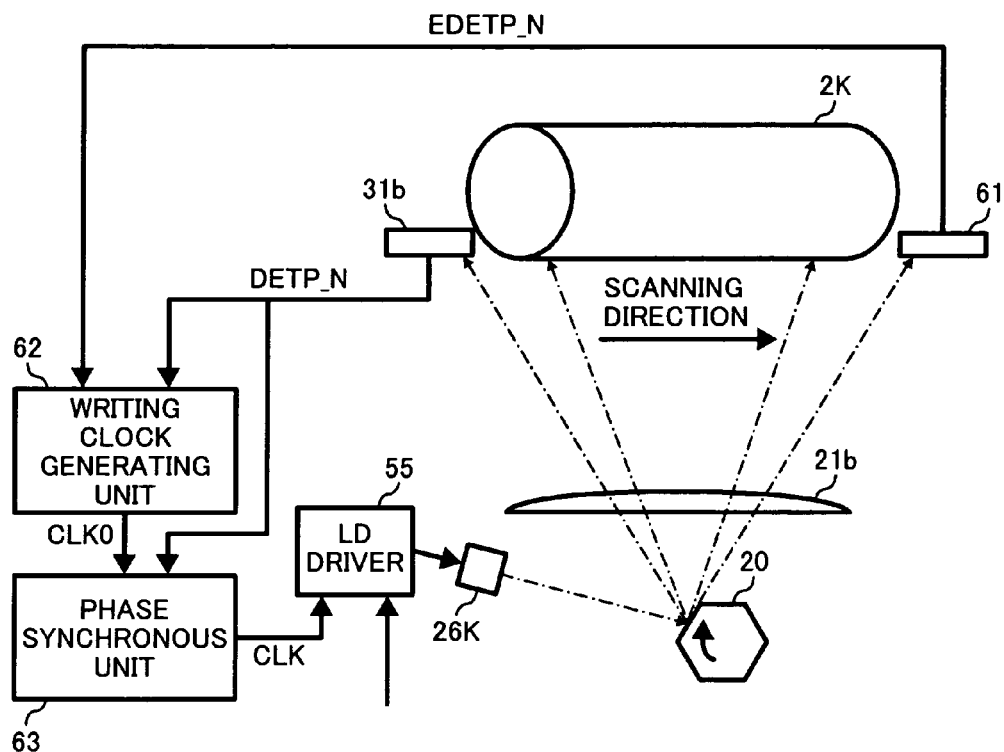
FIG. 7 is a block diagram illustrating a configuration of correcting a main scanning magnification by the optical device of FIG. 4.

Referring to FIG. 7, a configuration of correcting a main scanning magnification in the optical device is illustrated by using the laser unit 26K as an example. As other laser units 26Y, 26C, and 26M are configured to be same as the laser unit 26K, explanations for these laser units 26Y, 26C, and 26M are omitted.

The optical beams emitted from the laser unit 26K are entered to the polygon mirror 20, and are deflected by the rotations of the polygon mirror 20. As shown in FIG. 7, the deflected optical beams are received by the synchronous detection sensor 31b which is disposed outside an image area, expose the photoconductor drum 2Y, and are received by a rear-end synchronous detection sensor 61 which is disposed outside the image area through the fθ lens 21b in a sequential manner.

When the synchronous detection sensor 31b and the rear-end synchronous sensor 61 receive the optical beams, detection signals DETP_N and EDETP_N are respectively output by the synchronous sensor 31b and the rear-end synchronous sensor 61 to a writing clock generating unit 62. This writing clock generating unit 62 measures a count number of clock signals generated between a time the optical beam is received by the synchronous detection sensor 31b and a subsequent time the optical beam is received by the rear-end synchronous detection sensor 61, based on the detection signals DETP_N and EDETP_N. The writing clock generating unit 62 stores a reference count number. This reference count number is measured when the main scanning magnification is in an appropriate state. The writing clock generating unit 62 compares the measured count number and the reference count number, and corrects a writing clock frequency such that the measured count number is substantially equal to the reference count number. The writing clock generating unit 62 outputs a writing clock signal CLK0 based on the corrected writing clock frequency.

The writing clock generating unit 62 outputs a plurality of clock signals as the writing clock signals CLK0, each of which has a different phase. As the writing clock generating unit 62 corrects the main scanning magnification by generating the writing clock signals, the writing clock generating unit 62 may be referred to as a magnification correction unit.

The writing clocks CLK0 output by the writing clock generating unit 62 are input to a phase synchronous unit 63. The detection signal DETP_N output by the synchronous detection sensor 31b for every scanning of the optical beam is input to the phase synchronous unit 63.

Among the plurality of clock signals, the phase synchronous unit 63 selects one having a phase closest to a synchronous signal. The clock signal selected by the phase synchronous unit 63 is output to a LD driver 55 as a writing clock signal CLK. The LD driver 55 causes the laser unit 26 to emit based on an image signal (referred to as an image data) and output the optical beam at a desired timing based on a synchronization to the writing clock signal CLK.

Figure 8:
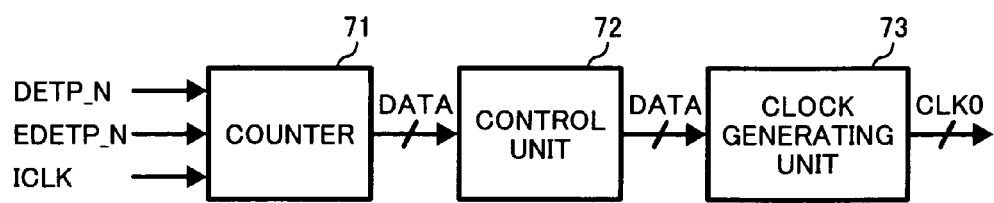
FIG. 8 is a block diagram illustrating a configuration of a writing clock generating unit included in FIG. 7.

Referring to FIG. 8, a configuration of the writing clock generating unit 62 included in FIG. 7 includes a counter 71, a control unit 72, and a clock generating unit 73.

When the detection signal DETP_N is input, the counter 71 begins to count a measurement clock signal ICLK. A count number of the measurement clock signal ICLK at which the detection signal EDETP_N is input is output to the control unit 72. The counter 71 is cleared by the detection signal DETP_N. A count number output from the counter 71 represents a scanning time between the synchronous detection senor 31b and the rear-end synchronous detection sensor 61.

The control unit 72 compares the measured count number and the reference count number, and corrects the writing clock frequency such that the measured count number is substantially equal to the reference count number. A result of the comparison is output to the clock generating unit 73.

The clock generating unit 73 generates and outputs the plurality of clock signals CLK0 having various phases with a frequency which corresponds to data output from the control unit 72. When the clock signals are generated, a phase variation function is used. This phase variation function described later with FIG. 9 may vary a PLL (phase locked loop) circuit or the phase of writing clock signals at a position or a plurality of positions along a main scanning line in the main scanning direction in units of 1/n of one cycle, where n is an integer of 2 or greater.

Figure 9:
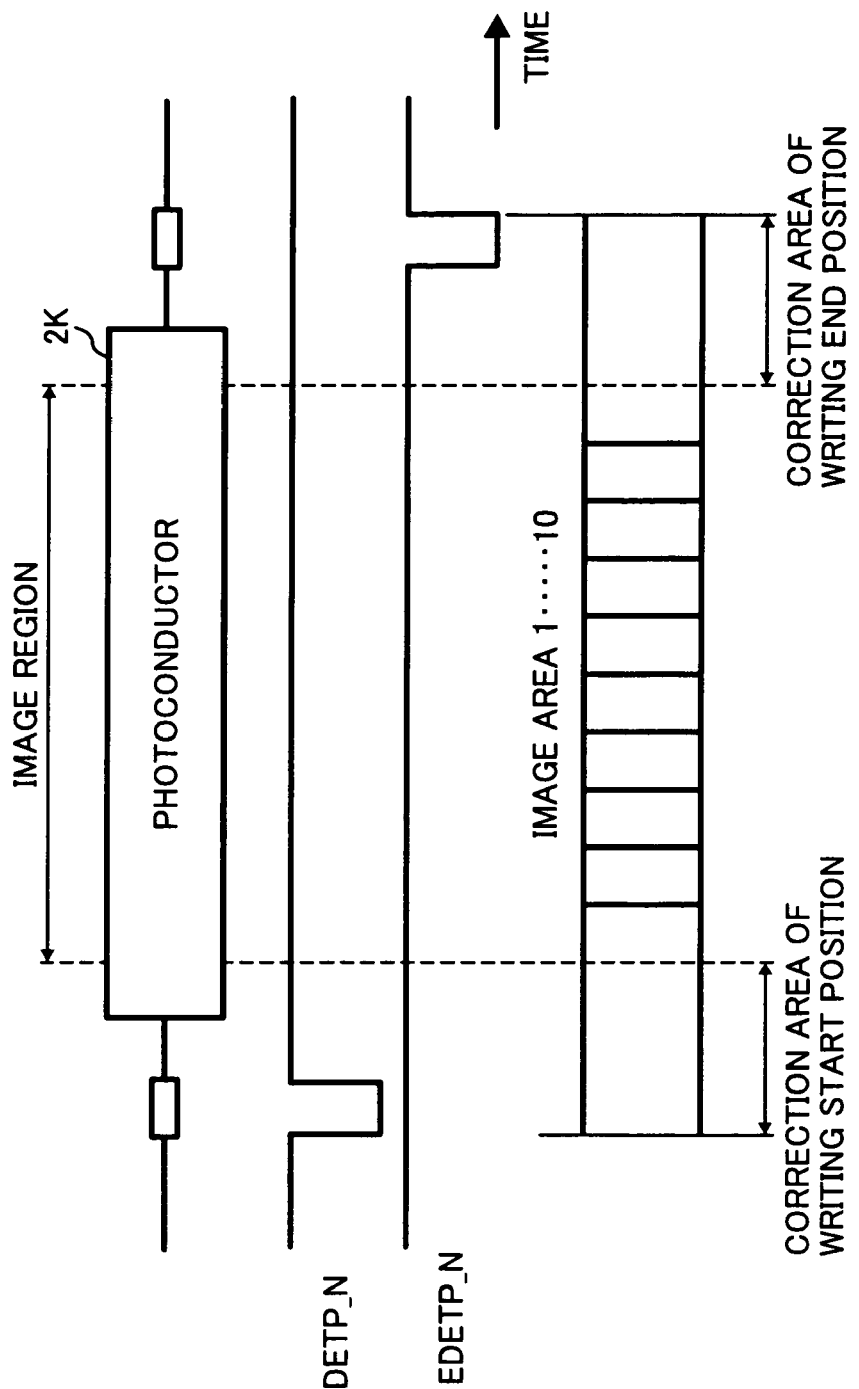
FIG. 9 is a schematic diagram illustrating an image region divided into ten image areas on a photoconductor.

Referring to FIG. 9, the phase variation function divides one scanning cycle into a plurality of image areas, and arranges a phase amount to vary for each image area. For example, an image region is divided into ten image areas, as illustrated in FIG. 9.

A detailed description of varying the phase of writing clock signals in the clock generating unit 73 of FIG. 8 for varying a writing start position will be given as follows.

The counter 71 uses the writing clock signals as the measurement clock signals ICLK. In a case where the writing start position is corrected by a related art method to correct the writing start position with the phase variation function, a phase of the measurement clock signals ICLK may be varied by the phase variation function, and the count number of the measured writing clock signals may be varied. In a case of using the related art method, the measurement count number and the reference count number are compared, and a writing frequency is corrected such that the measurement count number is substantially equal to the reference count number. However, in a case where the writing frequency is corrected, a magnification to the main scanning direction may be varied.

According to the exemplary embodiment of the present invention, with the variation of the writing start position, an occurrence of varying the main scanning magnification may be reduced by varying the phase of writing clock signals. Examples of the variation of the writing start position will be described later. Meanwhile, the clock generating unit 73 is treated as a unit capable of varying the phase of writing clock signals in units of ¼ of a cycle of the writing clock signal by using the phase variation function.

Figure 10:
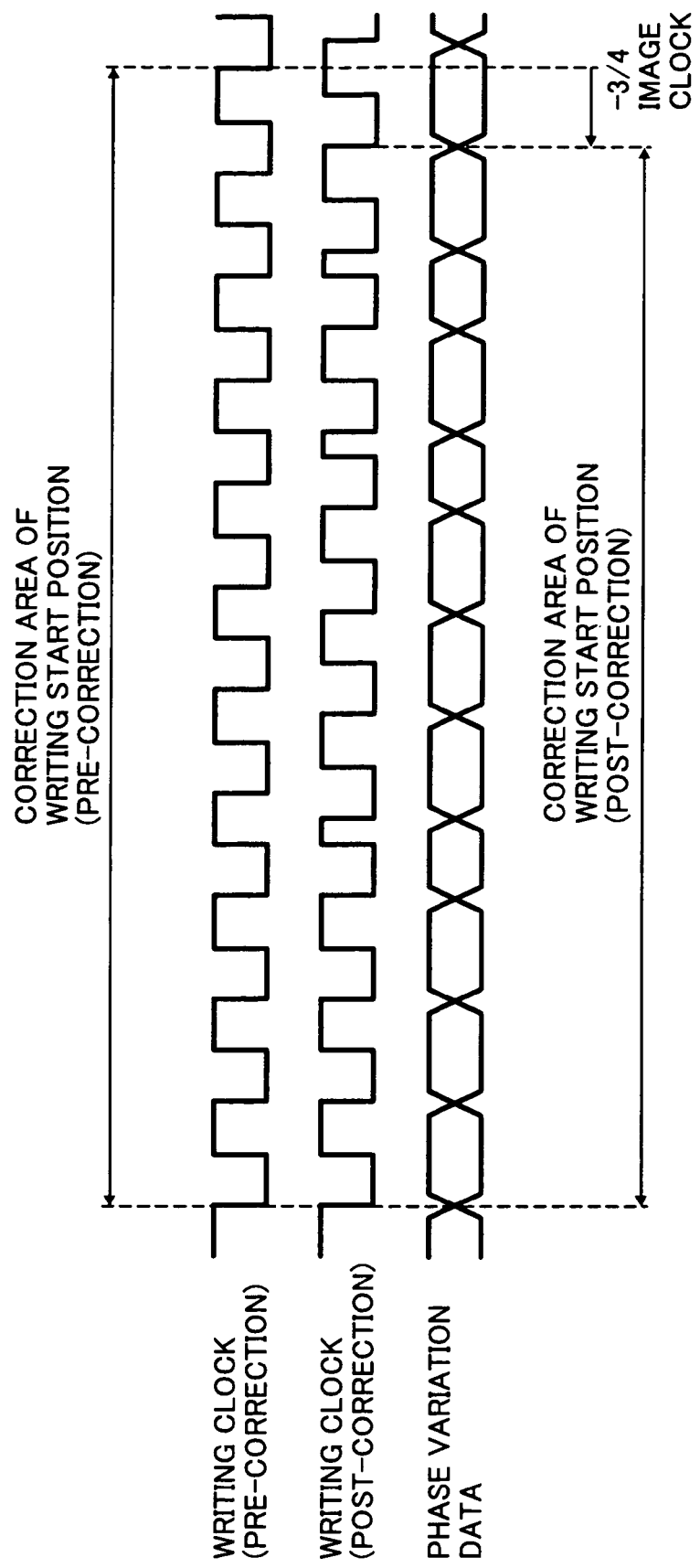
FIG. 10 is a diagram illustrating an example of a writing clock signal when a writing start position is advanced.

Referring to FIG. 10, one example of the variation of the writing start position is illustrated. In this example, the writing start position is advanced by ¾ of one pixel, resulting in an advancement of approximately 16 μm at 1200 dpi.

When the phase variation function is used, a writing clock number during one scanning operation is increased by ¾ of a pixel compared to the one writing clock cycle before the writing start position is advanced. In a related art manner, the main scanning magnification has been varied by correcting the writing clock frequency by a related art control unit.

In the exemplary embodiment of the present invention, when the writing start position is advanced, a phase of another writing clock signal is varied simultaneously. Thereby, the count number of the writing clock signals before advancing the writing start position and the count number of the writing clock signals after varying the writing start position become at least substantially the same. However, in a case where the phase of writing clock signals is varied with a large variation amount in a certain image area, the image is affected by misregistration. Thereby, the phase is evenly varied in a plurality of image areas.

For example, when one writing clock cycle is shifted by n/4 of the clock cycle for correcting the writing start position, a sum total value of the phase of each writing clock signal and a value of (n/4)/An is treated as the phase, where n is an integer and An is a number of all areas.

As shown in FIG. 10, the phase is shortened by ¾ of one writing clock cycle so as to vary the writing start position. A sum of phase variation amounts during one scanning cycle is made zero by extending the phases of writing clock signals by, for example, ¼ of the clock cycle in each of three image areas.

Figure 12:
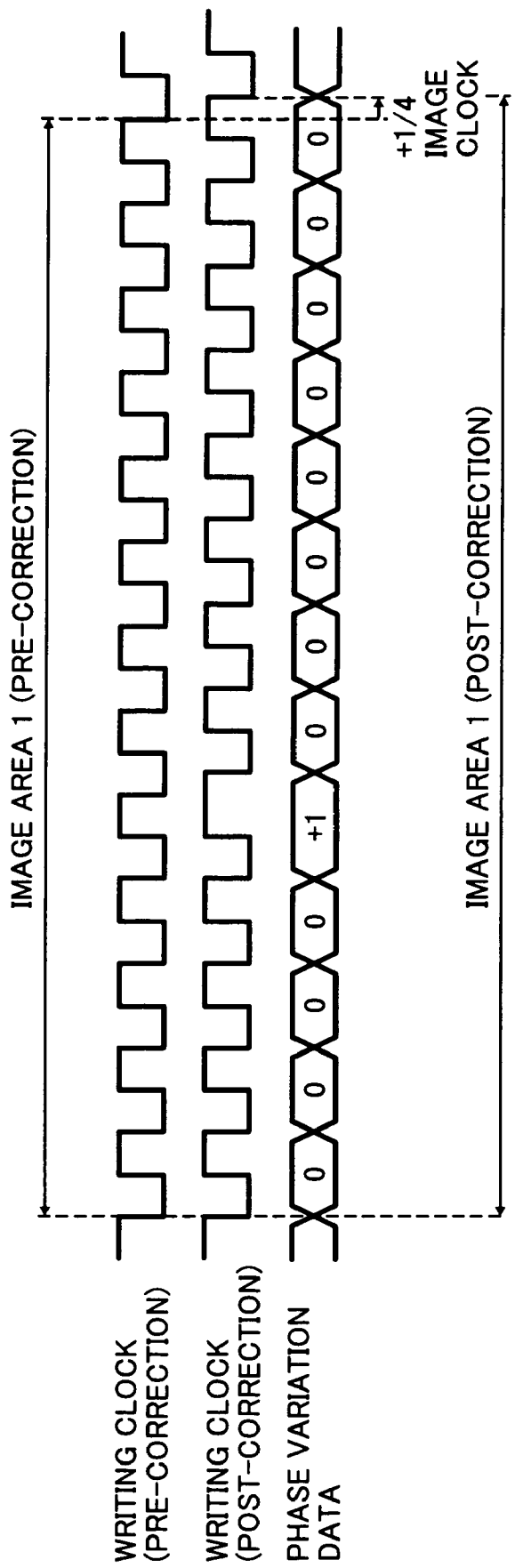
FIG. 12 is a diagram illustrating an example of the writing clock signals indicating one of the image areas.

Referring to FIG. 12, an example diagram illustrates the phase of writing clock signals which is extended by ¼ of the clock cycle in the image area 1. The sum of phase variation amounts during the one scanning cycle is made zero by applying the same process stated above to other two image areas. According to this process, the writing start position may be varied without varying the count number of the writing clock signals during one scanning cycle. Thereby, the writing clock frequency is not corrected by the control unit 72 so that the main scanning magnification may not be varied.

Figure 11:
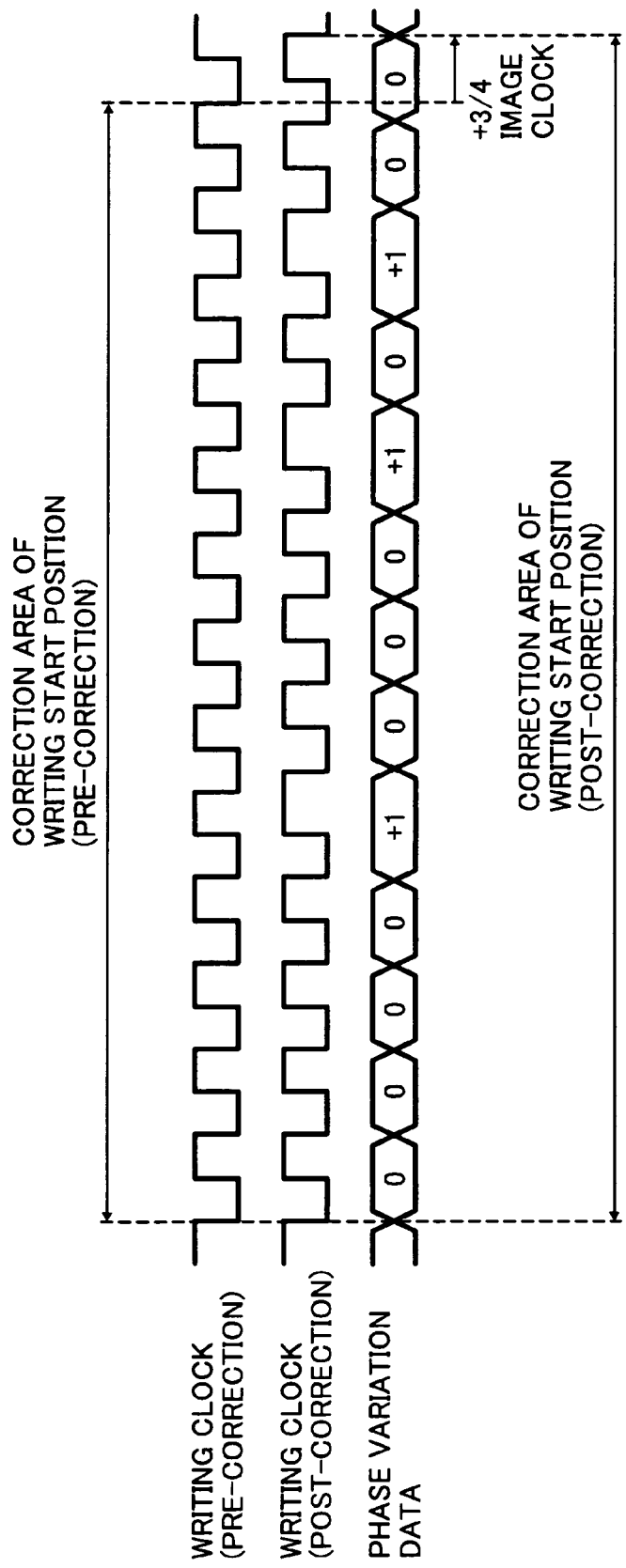
FIG. 11 is a diagram illustrating an example of the writing clock signals when the writing start position is extended.

Referring to FIG. 11, another example diagram illustrates another variation of the writing start position. As shown in FIG. 11, the writing start position is extended by ¾ of one image pixel clock signal. The sum of the phase variation amounts during one scanning cycle may be zero by shortening the phase of writing clock signals by ¾ of the clock cycle in another image area. Consequently, the writing start position may be varied without affecting the main scanning magnification.

In the above examples, with the variation of the writing start position, the phase of writing clock signals is varied in the plurality of image areas so that the sum of the phase variation amounts during one scanning cycle is zero. However, when the phase of writing clock signals is varied, the image is technically misregistered. When a correction amount of the phase is small, the image misregistration may be considered to be a non-problem level. However, when the correction amount of the phase is large, the image misregistration may be considered to be a problem level.

The phase of writing clock signals may be varied without the image misregistration by varying the phase of writing clock signals at a position after a writing operation is ended.

Figure 13:
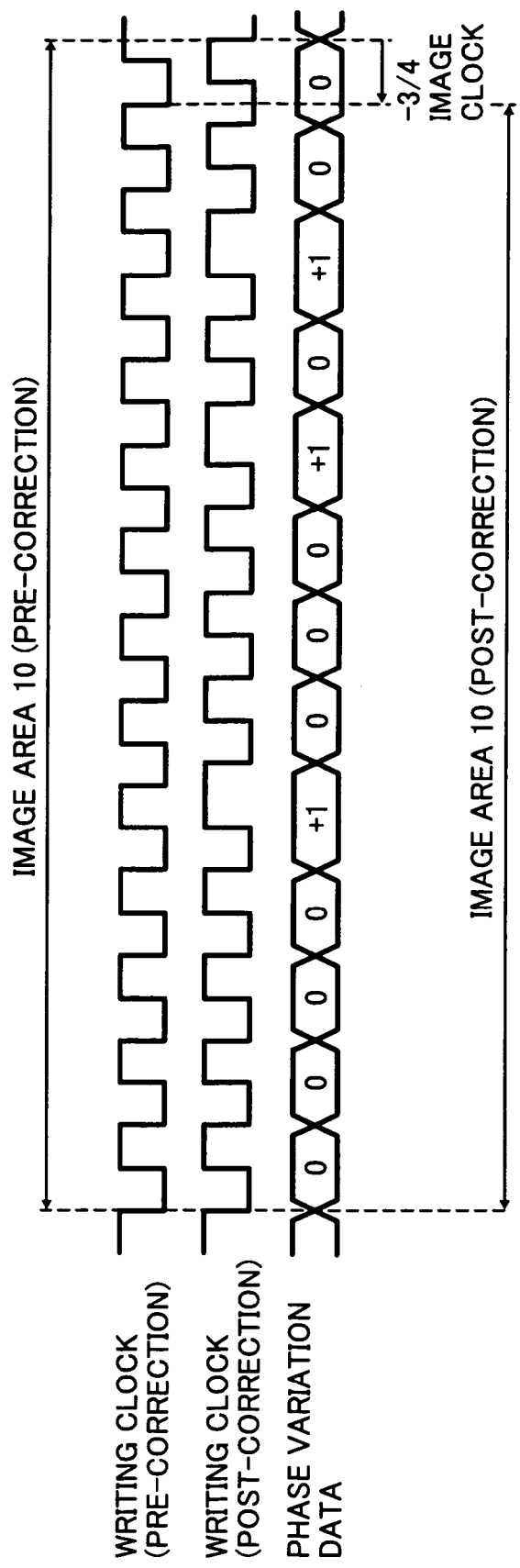
FIG. 13 is a diagram illustrating another example of the writing clock signals indicating another image area.

For example, when the writing start position is varied by extending the phase of writing clock signals by ¾ of the clock cycle as shown in FIG. 11, the phase of writing clock signals is shortened by ¾ of the clock cycle in the image area 10 in which the writing operation is ended, as shown in FIG. 13. Thereby, the sum of phase variation amounts during one scanning cycle is made zero.

Referring to FIG. 13, the image area 10 is illustrated with the writing clock signals. As shown in FIG. 13, the phase of writing clock signals is shortened in units of ¾ of the clock cycle in the image area 10.

According to the above process, the phase of writing clock signals is varied in an image area in which the writing operation is ended so that an occurrence of the image misregistration may be reduced. When a correction area of a writing end position does not exist due to a simplification of a hardware configuration and a reduction of an area number caused by a cost reduction, the correction may be made in an inconspicuous area, for example, an image edge so as to provide the same result.

Referring to FIG. 14, the main scanning magnification of the exemplary embodiment is corrected by an example procedure which will be described later.

Unlike the related art procedure illustrated in FIG. 2, the image forming apparatus of the exemplary embodiment extends and shortens the phase of the writing clock signals with the variation of the writing start position so as to reduce an occurrence of varying the main scanning magnification caused by varying the count number of the writing clock signals.

In a step 1301 of FIG. 14, when the counter 71 is cleared by the detection signal DETP_N of the synchronous detection sensor 31b, the measurement clock signal ICLK is counted by the counter 71. A count number N of the counter 71 is output to the control unit 72 by the detection signal EDETP_N of the rear-end synchronous detection sensor 61. Detailed descriptions of the counter 71 and the control unit 72 are stated with FIG. 8.

In a step 1302, the count number N which is measured and the reference count number Rref are compared by the control unit 72. The reference count number Rref is a predetermined number.

For example, the phase of the writing clock signals is shorted by ¾ of one writing clock cycle to vary the writing start position so that a main scanning writing position is corrected, as shown in FIG. 10. In this instance, the measured count number N can be expressed as (N+¾). In other words, when the writing start position is varied, the writing clock frequency is corrected at the same time. Thereby, the main scanning magnification may not be corrected.

In a step 1303, according to the exemplary embodiment of the present invention, another count number N' is used to correct the main scanning magnification. The count number N' is computed by N'=N±a correction amount, where the correction amount is −¾ in this example.

In a step 1304, the writing clock frequency of a post-correction (i.e., after the correction of the main scanning magnification) is represented by F' which is computed by F'=F×Nref/N', where F is the writing clock frequency of a pre-correction (i.e., before the correction of the main scanning magnification). Therefore, this procedure reduces an occurrence of an influence caused by the correction by the phase variation function to the main scanning magnification.

When the writing start position is extended by extending the phase in units of ¾ of one writing clock cycle by the phase variation function, as shown in FIG. 11, the measured count number may be reduced. Thereby, the count number N' is computed by N'=N+¾, and the writing clock signal of the post-correction F' is computed by F'=F×Nref/N' so as to reduce an occurrence of influence caused by the correction by the phase variation function to the main scanning magnification.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced otherwise than as specifically described herein.

What is claimed is:

1. An image forming apparatus, comprising:
   a light source to illuminate in response to image data;
   a deflector to deflect an optical beam output from the light source into a scanning beam running along a main scanning line across an image forming area in a main scanning direction;
   a plurality of beam detectors to detect the scanning beam at a plurality of different positions along the main scanning line, the plurality of beam detectors including first and second beam detectors detecting the scanning beam at positions in front-end and rear-end sides, respectively, in the main scanning direction;
   a clock generator to generate writing clock signals for controlling an illumination of the light source;
   a measurement mechanism to measure a count number of the writing clock signals generated during a scanning period between detections of the scanning beam by the first and second beam detectors;
   a frequency corrector to correct a frequency of the writing clock signals so the count number measured by the measurement mechanism becomes substantially equivalent to a predetermined reference count number; and
   a phase corrector to vary a phase of the writing clock signals so the count number is substantially constant before and after the phase of the writing clock signals is varied, wherein the phase corrector divides the scanning period into a plurality of sub-periods corresponding to a plurality of image areas, and varies the phase of the writing clock signals with respect to each of the plurality of image areas so a sum of phase variation amounts generated before and after the phase of the writing clock signals is varied becomes substantially zero.

2. The image forming apparatus according to claim 1, wherein the phase corrector varies the phase of the writing clock signals in one of the plurality of image areas so the count number is substantially constant before and after the phase of the writing clock signals is varied.

3. The image forming apparatus according to claim 2, wherein the one of the plurality of image areas is outside of the image forming area.

4. The image forming apparatus according to claim 1, wherein the phase corrector varies the phase of the writing clock signals in each of the plurality of image areas so the count number is substantially constant before and after the phase of the writing clock signals is varied.

5. The image forming apparatus according to claim 4, wherein each of the plurality of image areas is inside of the image forming area.

6. An image forming apparatus, comprising:
   a light source to illuminate in response to image data;
   a deflector to deflect an optical beam output from the light source into a scanning beam running along a main scanning line across an image forming area in a main scanning direction;
   a plurality of beam detectors to detect the scanning beam at a plurality of different positions along the main scanning line, the plurality of beam detectors including first and second beam detectors detecting the scanning beam at positions in front-end and rear-end sides, respectively, in the main scanning direction;
   a clock generator to generate writing clock signals for controlling an illumination of the light source;
   a measurement mechanism to measure a count number of the writing clock signals generated during a scanning period between detections of the scanning beam by the first and second beam detectors;
   a phase corrector to vary a phase of the writing clock signals; and
   a frequency corrector to modify the count number measured by the measurement mechanism based on a phase variation of the writing clock signals performed by the phase corrector, and corrects a frequency of the writing clock so the modified count number is substantially equalized to a predetermined reference number, wherein the frequency corrector adds a sum of phase variation amounts to the measured count number when the sum of the phase variation amounts of the writing clock signals varied by the phase corrector is in a direction delaying the phase of the writing clock signals, and subtracts the sum of the phase variation amounts from the measured count number when the sum of the phase variation amounts of the writing clock signals varied by the phase corrector is in a direction advancing the phase.

7. An optical apparatus, comprising:
   a light source to illuminate in response to image data;
   a deflector to deflect an optical beam output from the light source into a scanning beam running along a main scanning line across an image forming area in a main scanning direction;
   a plurality of beam detectors to detect the scanning beam at a plurality of different positions along the main scanning line, the plurality of beam detectors including first and second beam detectors detecting the scanning beam at positions in front-end and rear-end sides, respectively, in the main scanning direction;
   a clock generator to generate writing clock signals for controlling an illumination of the light source;
   a measurement mechanism to measure a count number of the writing clock signals generated during a scanning period between detections of the scanning beam by the first and second beam detectors;
   a frequency corrector to correct a frequency of the writing clock signals so the count number measured by the measurement mechanism becomes substantially equivalent to a predetermined reference count number; and a phase corrector to vary a phase of the writing clock signals so the count number is substantially constant before and after the phase of the writing clock signals is varied, wherein the phase corrector divides the scanning period into a plurality of sub-periods corresponding to a plurality of image areas, and varies the phase of the writing clock signals with respect to each of the plurality of image areas so a sum of phase variation amounts generated before and after the phase of the writing clock signals is varied becomes substantially zero.

8. The optical apparatus according to claim 7, wherein the phase corrector varies the phase of the writing clock signals in one of the plurality of image areas so the count number is substantially constant before and after the phase of the writing clock signals is varied.

9. The optical apparatus according to claim 8, wherein the one of the plurality of image areas is outside of the image forming area.

10. The optical apparatus according to claim 7, wherein the phase corrector varies the phase of the writing clock signals in each of the plurality of image areas so the count number is substantially constant before and after the phase of the writing clock signals is varied.

11. The optical apparatus according to claim 10, wherein each of the plurality of image areas is inside of the image forming area.

* * * * *